US012811059B2

(12) United States Patent
Mizuno

(10) Patent No.: US 12,811,059 B2
(45) Date of Patent: Nov. 24, 2026

(54) CERAMIC ELECTRONIC COMPONENT

(71) Applicant: TAIYO YUDEN CO., LTD., Tokyo (JP)

(72) Inventor: Kotaro Mizuno, Takasaki (JP)

(73) Assignee: TAIYO YUDEN CO., LTD, Tokyo (JP)

( * ) Notice: Subject to any disclaimer, the term of this patent is extended or adjusted under 35 U.S.C. 154(b) by 38 days.

(21) Appl. No.: 18/472,130

(22) Filed: Sep. 21, 2023

(65) Prior Publication Data

US 2024/0112861 A1 Apr. 4, 2024

(30) Foreign Application Priority Data

Sep. 29, 2022 (JP) ................................. 2022-156794

(51) Int. Cl.
*H01G 4/30* (2006.01)
*H01G 4/008* (2006.01)

(52) U.S. Cl.
CPC ............. *H01G 4/0085* (2013.01); *H01G 4/30* (2013.01)

(58) Field of Classification Search
None
See application file for complete search history.

(56) References Cited

U.S. PATENT DOCUMENTS

2004/0070903 A1* 4/2004 Nagai ...................... H01G 4/30 361/58
2004/0090721 A1 5/2004 Nagai et al.
2012/0162858 A1* 6/2012 Tanaka ................. H01G 4/1227 361/321.4
2013/0321980 A1 12/2013 Suzuki et al.
2015/0155098 A1 6/2015 Yamaguchi et al.
2018/0268999 A1 9/2018 Shimada et al.
(Continued)

FOREIGN PATENT DOCUMENTS

JP 2012129508 A 7/2012
JP 2018152547 A 9/2018
(Continued)

OTHER PUBLICATIONS

A Notice of Reasons for Refusal issued by the Japanese Patent Office, mailed May 26, 2026, for Japanese counterpart application No. 2022-156794. (4 pages).
(Continued)

*Primary Examiner* — Timothy J. Dole
*Assistant Examiner* — Esther N Lian
(74) *Attorney, Agent, or Firm* — Law Office of Katsuhiro Arai

(57) ABSTRACT

A ceramic electronic component contains a multilayer chip constituted by alternately stacked multiple dielectric layers whose primary component is ceramic, and multiple internal electrode layers whose primary component is metal, wherein: at least one of the multiple internal electrode layers has, at its interface with an adjoining dielectric layer, a segregation layer containing an additive metal element(s) different from the primary component metal of the internal electrode layers; Si and the additive metal element(s) are present at least at one grain boundary in the adjoining dielectric layer; and the atomic concentration ratio of the additive metal element(s)/Si at the grain boundary is 1.3 or higher.

13 Claims, 7 Drawing Sheets

(56) References Cited

U.S. PATENT DOCUMENTS

| | | | | |
|---|---|---|---|---|
| 2019/0135701 | A1 * | 5/2019 | Yun | H01G 4/1236 |
| 2019/0148042 | A1 * | 5/2019 | Yun | H01G 4/1281 361/275.3 |
| 2020/0051747 | A1 * | 2/2020 | Park | H01G 4/30 |
| 2021/0210288 | A1 * | 7/2021 | Kang | H01G 4/1245 |
| 2022/0028611 | A1 * | 1/2022 | Iguchi | H01G 4/30 |
| 2022/0130608 | A1 * | 4/2022 | Mizuno | H01G 4/1209 |
| 2022/0130615 | A1 * | 4/2022 | Jung | H01G 4/012 |
| 2022/0139619 | A1 * | 5/2022 | Lee | H01G 4/12 361/301.4 |
| 2022/0139630 | A1 | 5/2022 | Yamada et al. | |
| 2022/0157531 | A1 * | 5/2022 | Lee | H01G 4/008 |
| 2022/0270822 | A1 * | 8/2022 | Baik | H01G 4/30 |
| 2022/0301770 | A1 * | 9/2022 | Lee | H01G 4/0085 |

FOREIGN PATENT DOCUMENTS

| | | | |
|---|---|---|---|
| JP | 2022072584 | A | 5/2022 |
| WO | 03036666 | A1 | 5/2003 |
| WO | 2012111592 | A1 | 8/2012 |
| WO | 2014024538 | A1 | 2/2014 |

OTHER PUBLICATIONS

A Notice of Reasons for Refusal issued by the Japanese Patent Office, mailed Oct. 13, 2026, for Japanese counterpart application No. 2022-156794. (7 pages).

* cited by examiner

CERAMIC ELECTRONIC COMPONENT

CROSS-REFERENCE TO RELATED APPLICATIONS

The present application claims priority to Japanese Patent Application No. 2022-156794, filed Sep. 29, 2022, the disclosure of which is incorporated herein by reference in its entirety including any and all particular combinations of the features disclosed therein.

BACKGROUND

Field of the Invention

The present invention relates to a ceramic electronic component.

Description of the Related Art

Multilayer ceramic capacitors and other ceramic electronic components are produced by printing a metal paste whose primary material is metal powder, on dielectric green sheets whose primary material is barium titanate or other dielectric material, followed by stacking, pressure-bonding, cutting, removal of binder, sintering, and application of external electrodes, for example. As the market demands size reduction and capacity increase, these ceramic electronic components are required to have thinner dielectric layers, thinner internal electrode layers, and more stacked layers.

On the other hand, thinner dielectric layers are accompanied by increased electric field strengths, which makes it harder to ensure service life. In addition to studies based on dielectric material designs that explore, for example, dissolving trace additives such as rare earth oxides in barium titanate and other dielectric materials as solid solutions, recent years have seen reports of studies based on interface designs between dielectric layers and internal electrode layers that explore adding heterogeneous metal elements to internal electrode layers as additive metal elements (refer to Patent Literature 1, for example). It is considered that forming segregation layers containing additive metal elements at the interfaces between dielectric layers and internal electrode layers will create stronger Schottky barriers, resulting in improved service life (refer to Patent Literature 2, for example).

BACKGROUND ART LITERATURES

Patent Literature 1: International Patent Laid-open No. 2012/111592

Patent Literature 2: International Patent Laid-open No. 2014/024538

SUMMARY

For the purpose of reducing input energy in the manufacturing processes of ceramic electronic components, as well as inhibiting discontinuity resulting from excessive sintering of internal electrode layers whose primary component is metal, attempts are being made to lower the sintering temperature by introducing a liquid phase component that functions as a sintering additive. On the other hand, a liquid phase, if produced in the sintering step, may cause various elements to dissolve in it, thus interfering with the formation of desired microstructures. This can also occur when segregation layers containing additive metal elements are formed at the interfaces between dielectric layers and internal electrode layers.

The present invention was made in light of the aforementioned problems, and an object of the present invention is to provide a ceramic electronic component that allows segregation layers containing an additive metal element(s) to form stably at the interfaces between dielectric layers and internal electrode layers, even when a liquid phase component that functions as a sintering additive is present.

The ceramic electronic component pertaining to the present invention is characterized in that it comprises a multilayer chip constituted by alternately stacked multiple dielectric layers whose primary component is ceramic and multiple internal electrode layers whose primary component is metal, wherein: at least one of the multiple internal electrode layers has, at its interface with an adjoining dielectric layer, a segregation layer containing an additive metal element(s) different from the primary component metal of the internal electrode layers; Si and the additive metal element(s) are present at least at one grain boundary in the adjoining dielectric layer; and the atomic concentration ratio of the additive metal element(s)/Si at the grain boundary is 1.3 or higher.

Between the two dielectric grains sandwiching the grain boundary in the aforementioned ceramic electronic component, the concentration peak(s) of the additive metal element(s), and the concentration peak of Si, may appear at the same position or different positions.

In the adjoining dielectric layer in the aforementioned ceramic electronic component, the ratio of Si to Ti may be 0.1 at % or higher and 5.0 at % or lower.

In the aforementioned ceramic electronic component, the additive metal element(s) at the grain boundary may be unevenly distributed at a higher concentration than Si in at least one part of the grain boundary.

In the aforementioned ceramic electronic component, the additive metal element(s) may be one or more types selected from As, Au, Co, Cr, Cu, Fe, In, Ir, Mg, Os, Pd, Pt, Re, Rh, Ru, Se, Sn, Ge, Te, W, Y, Zn, Ag, Mo, and Ge.

In the aforementioned ceramic electronic component, the additive metal elements may include a first additive metal element and a second additive metal element, where the difference between the oxidation-reduction potential of the first additive metal element and the oxidation-reduction potential of the second additive metal element may be 1.8 V or more.

In the aforementioned ceramic electronic component, the primary component of the multiple internal electrode layers may be Ni or Cu.

In the aforementioned ceramic electronic component, the multiple internal electrode layers may contain the additive metal element(s) by 0.01 at % or more and 5 at % or less relative to the primary component metal.

In the aforementioned ceramic electronic component, the per-layer thickness of the multiple dielectric layers may be 0.2 μm or more and 10 μm or less.

In the aforementioned ceramic electronic component, the average grain size of the dielectric grains in the multiple dielectric layers may be 20 nm or more and 600 nm or less.

In the aforementioned ceramic electronic component, the per-layer thickness of the multiple internal electrode layers may be 0.1 μm or more and 2 μm or less.

According to the present invention, a ceramic electronic component that allows segregation layers containing a composite element to form stably at the interfaces between dielectric layers and internal electrode layers, even when a liquid phase component that functions as a sintering additive is present, can be provided.

DESCRIPTION OF THE SYMBOLS

Figure 1:
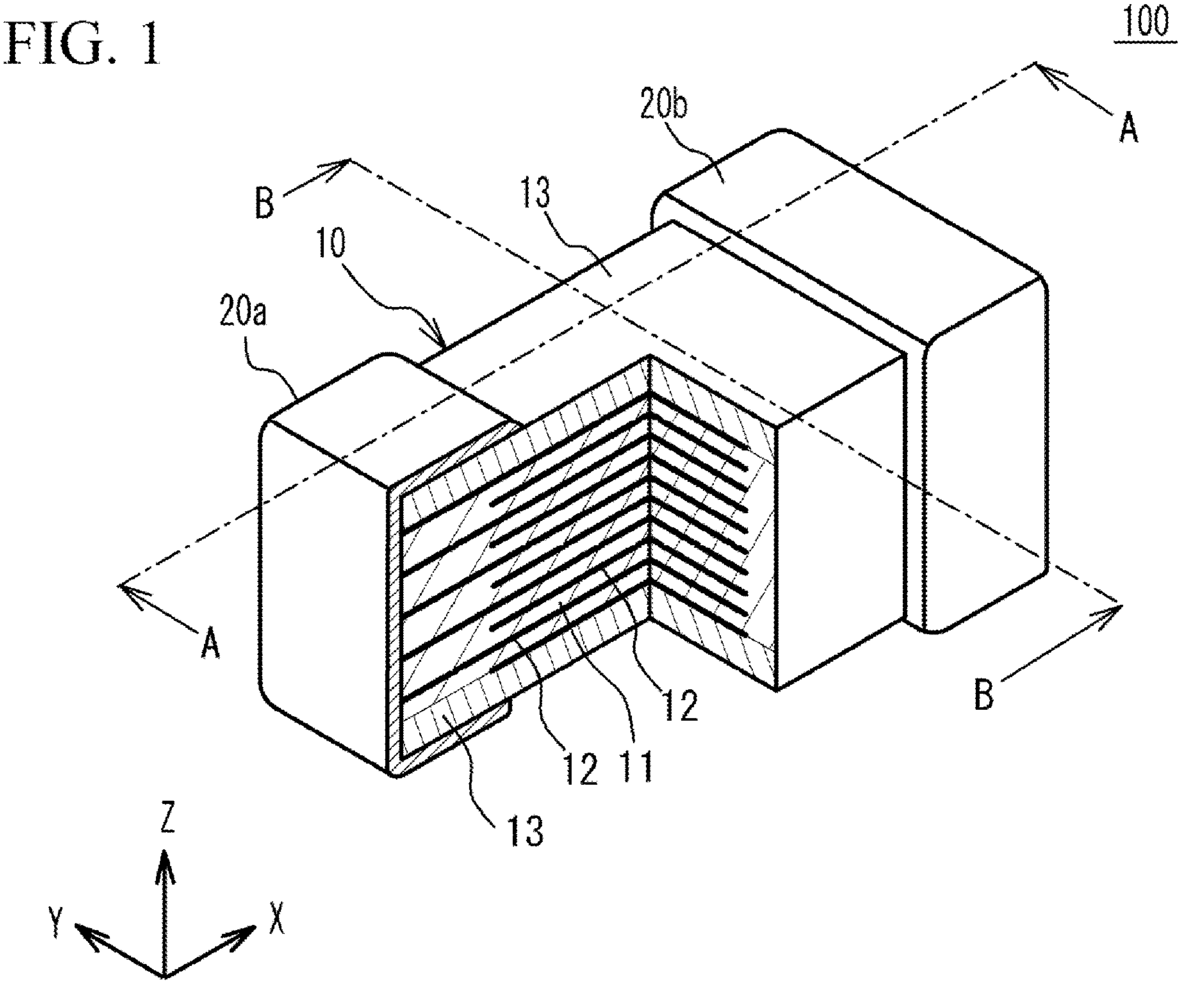
FIG. 1 is a perspective partial cross-sectional view of a multilayer ceramic capacitor.

10 Multilayer chip
11 Dielectric layer
12 Internal electrode layer
13 Cover layer
14 Capacitive part
15 End margin
16 Side margin
20*a*, 20*b* External electrodes
31 Segregation layer
32 Dielectric grain
33 Liquid phase component
34 Additive metal element component
51 Base material
52 Dielectric green sheet
53 Internal electrode pattern
54 Cover sheet
100 Multilayer ceramic capacitor

DETAILED DESCRIPTION OF EMBODIMENTS

Embodiments are explained below by referring to the drawings.

Figure 2:
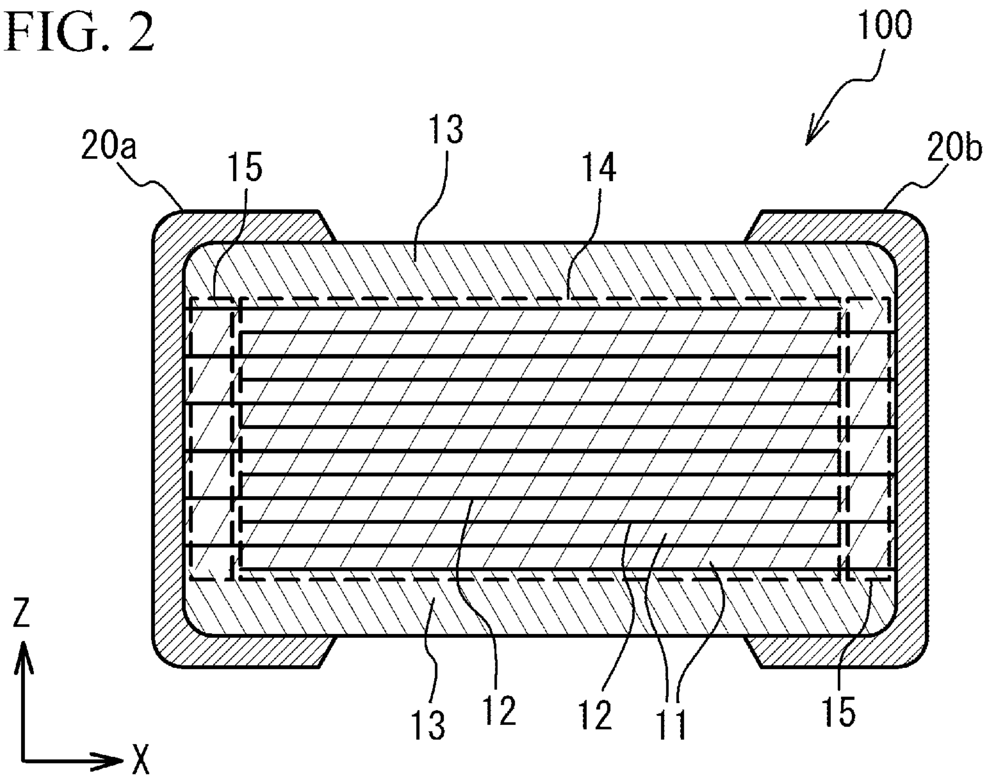
FIG. 2 is a cross-sectional view along line A-A in FIG. 1.
Figure 3:
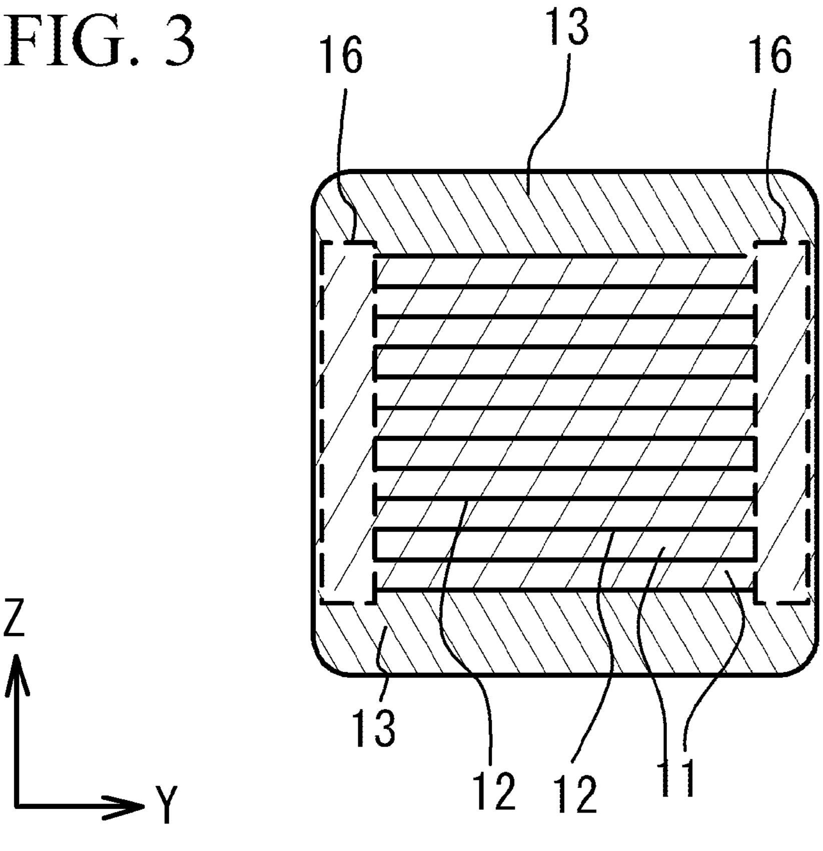
FIG. 3 is a cross-sectional view along line B-B in FIG. 1.

FIG. 1 is a perspective partial cross-sectional view of a multilayer ceramic capacitor 100 pertaining to an embodiment. FIG. 2 is a cross-sectional view along line A-A in FIG. 1. FIG. 3 is a cross-sectional view alone line B-B in FIG. 1. As illustrated in FIGS. 1 to 3, the multilayer ceramic capacitor 100 comprises a multilayer chip 10 having a roughly rectangular solid shape, as well as external electrodes 20*a*, 20*b* provided at any two opposing end faces of the multilayer chip 10. It should be noted that the four faces, other than the top face and bottom face in the stacking direction, of the multilayer chip 10 are referred to as “side faces.” The aforementioned two end faces are included in those four side faces. The external electrodes 20*a*, 20*b* are present in a manner extending to the top face and bottom face in the stacking direction, as well as the two side faces other than the two end faces, of the multilayer chip 10. However, the external electrodes 20*a*, 20*b* are separated from each other.

It should be noted that, in FIGS. 1 to 3, the X-axis direction represents the length direction of the multilayer chip 10, being the direction in which the two end faces of the multilayer chip 10 are facing each other, and also being the direction in which the external electrode 20*a* and external electrode 20*b* are facing each other. The Y-direction represents the width direction of the internal electrode layers, being the direction in which, among the four side faces of the multilayer chip 10, the two side faces other than the two end faces are facing each other. The Z-axis direction represents the stacking direction, being the direction in which the top face and bottom face of the multilayer chip 10 are facing each other. The X-axis direction, Y-axis direction and Z-axis direction are orthogonal to one another.

The multilayer chip 10 has a constitution where dielectric layers 11 containing a ceramic material that functions as a dielectric body, and internal electrode layers 12, are alternately stacked. The edges of the respective internal electrode layers 12 are alternately exposed to the end face where the external electrode 20*a* is provided, and the end face where the external electrode 20*b* is provided, of the multilayer chip 10. This way, the respective internal electrode layers 12 become alternately connected electrically to the external electrode 20*a* and the external electrode 20*b*. This results in the multilayer ceramic capacitor 100 having a constitution where the multiple dielectric layers 11 are stacked via the internal electrode layers 12 in between. Also, in the multilayer body constituted by the dielectric layers 11 and internal electrode layers 12, internal electrode layers 12 are placed at the outermost layers in the stacking direction, while the top face and bottom face of the multilayer body are covered with cover layers 13. The cover layers 13 are such that their primary component is a ceramic material. Regarding the material of the cover layers 13, the primary component of the dielectric layers 11 and that of the ceramic material may be the same, for example.

The size of the multilayer ceramic capacitor 100 may be, for example, 0.25 mm long, 0.125 mm wide, and 0.125 mm high, or 0.4 mm long, 0.2 mm wide, and 0.2 mm high, or 0.6 mm long, 0.3 mm wide, and 0.3 mm high, or 0.6 mm long, 0.3 mm wide, and 0.110 mm high, or 1.0 mm long, 0.5 mm wide, and 0.5 mm high, or 1.0 mm long, 0.5 mm wide, and 0.1 mm high, or 3.2 mm long, 1.6 mm wide, and 1.6 mm high, or 4.5 mm long, 3.2 mm wide, and 2.5 mm high; however, the size is not limited to the foregoing.

The dielectric layers 11 are such that their primary phase is a ceramic material having a perovskite structure expressed by the general formula $ABO_3$. It should be noted that this perovskite structure includes $ABO_{3-\alpha}$ which deviates from a stoichiometric composition. For example, at least one of $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) forming a perovskite structure, etc., may be selected and used as this ceramic material. $Ba_{1-x-y}Ca_xSr_yTi_{1-z}Zr_zO_3$ represents barium strontium titanate, barium calcium titanate, barium zirconate, barium zirconate titanate, calcium zirconate titanate, barium calcium zirconate titanate, etc.

The dielectric layers 11 may have additives added thereto. Additives for the dielectric layers 11 include oxides of Mo (molybdenum), Nb (niobium), Ta (tantalum), W (tungsten), Mg (magnesium), Mn (manganese), V (vanadium), Cr (chromium), and rare earth elements (Y (yttrium), Sm (samarium), Eu (europium), Gd (gadolinium), Tb (terbium), Dy (dysprosium), Ho (holmium), Er (erbium), Tm (thulium), and Yb (ytterbium)), or oxides containing Co (cobalt), Ni (nickel), Li (lithium), B (boron), Na (sodium), K (potassium), or Si (silicon), or glass containing Co, Ni, Li, B, Na, K, or Si.

The primary component of the internal electrode layers 12, although not specifically limited, is Ni, Cu (copper), Sn (tin), or other base metal. A precious metal such as Pt (platinum), Pd (palladium), Ag (silver), or Au (gold), or alloy composed thereof, may be used as the primary component of the internal electrode layers 12.

The internal electrode layers 12 contain an additive metal element(s) in addition to the primary component metal. Although not specifically limited, preferably the additive metal element(s) is/are more noble than the primary component metal of the internal electrode layers 12. The additive metal element(s) is/are one, or two or more types selected from Au, Sn, Cr, Fe (iron), Y, In (indium), As (arsenic), Co, Cu, Ir (iridium), Mg, Os (osmium), Pd, Pt, Re (rhenium), Rh (rhodium), Ru (ruthenium), Se (selenium), Te (tellurium), W, Zn (zinc), Ag, Mo, and Ge (germanium).

As illustrated in FIG. 2, the region in which the internal electrode layers 12 connected to the external electrode 20*a* are facing the internal electrode layers 12 connected to the external electrode 20*b*, is a region where capacitance is generated in the multilayer ceramic capacitor 100. Accordingly, this region where capacitance is generated is referred to as a "capacitive part 14." In other words, the capacitive part 14 is a region where a pair of adjoining internal electrode layers 12 connected to the different external electrodes are facing each other.

The region where a pair of internal electrode layers 12 connected to the external electrode 20*a* are facing each other, not via an internal electrode layer 12 in between that is connected to the external electrode 20*b*, is referred to as an "end margin 15." Meanwhile, the region where a pair of internal electrode layers 12 connected to the external electrode 20*b* are facing each other, not via an internal electrode layer 12 in between that is connected to the external electrode 20*a*, is also an "end margin 15." In other words, the end margins 15 are regions where a pair of internal electrode layers 12 connected to the same external electrode are facing each other, not via an internal electrode layer 12 in between that is connected to the different external electrode. The end margins 15 are regions where capacitance is not generated.

As illustrated in FIG. 3, the regions in the multilayer chip 10 from the two side faces, other than the two end faces, among the four side faces of the multilayer chip 10, to the internal electrode layers 12, are referred to as "side margins 16." In other words, the side margins 16 are regions in the aforementioned multilayer structure where the stacked multiple internal electrode layers 12 are provided in a manner covering their end parts extending toward the two side faces. The side margins 16 are also regions where capacitance is not generated.

In such multilayer ceramic capacitor, thinner dielectric layers, thinner internal electrode layers and more stacked layers are required for the purpose of size reduction and capacity increase. However, thinner dielectric layers are accompanied by increased electric field strengths, which makes it harder to ensure service life. In addition to studies based on dielectric material designs that explore, for example, dissolving trace additives such as rare earth oxides in barium titanate and other dielectric materials as solid solutions, recent years have seen reports of studies based on interface designs between dielectric layers and internal electrode layers that explore adding heterogeneous metal elements to internal electrode layers as additive metal elements. It is considered that forming segregation layers containing additive metal elements at the interfaces between dielectric layers and internal electrode layers will create stronger Schottky barriers, resulting in improved service life.

Incidentally, the dielectric layers 11 and internal electrode layers 12 are obtained by sintering dielectric green sheets containing a ceramic powder simultaneously with internal electrode patterns containing a metal powder. For the purpose of reducing input energy in this sintering step, as well as inhibiting discontinuity resulting from excessive sintering of the internal electrode layers 12 whose primary component is metal, attempts are being made to lower the sintering temperature by introducing to the dielectric green sheets a liquid phase component that functions as a sintering additive. On the other hand, a liquid phase, if produced in the sintering step, may cause various elements to dissolve in it, thus interfering with the formation of desired microstructures. This can also occur when segregation layers containing an additive metal element(s) are formed at the interfaces between the dielectric layers 11 and the internal electrode layers 12.

Accordingly, the multilayer ceramic capacitor 100 pertaining to this embodiment has a constitution that allows segregation layers containing an additive metal element(s) to form stably at the interfaces between the dielectric layers 11 and the internal electrode layers 12, even when a liquid phase component that functions as a sintering additive is present.

Figure 4:
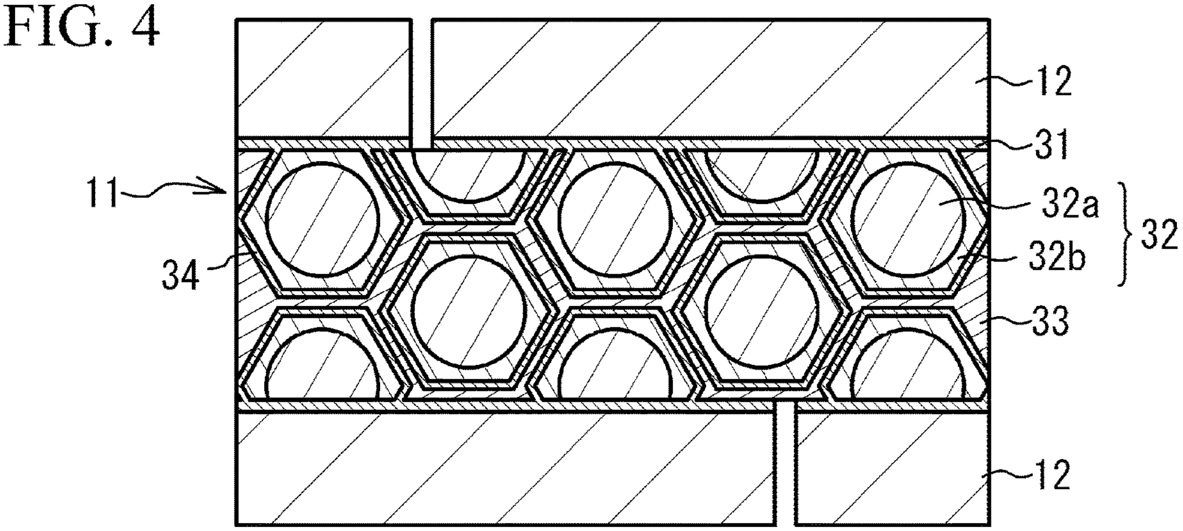
FIG. 4 is a schematic view of a dielectric layer and two internal electrode layers adjoining the dielectric layer.

FIG. 4 is a schematic view of a dielectric layer 11 and two internal electrode layers 12 adjoining the dielectric layer 11. As illustrated in FIG. 4, the internal electrode layers 12 have segregation layers 31 at their interfaces with the dielectric layer 11. The segregation layers 31 contain the primary component of the internal electrode layers 12 and the additive metal element(s) added to the internal electrode layers 12. The segregation layers 31 can be defined as regions where, when a STEM (scanning transmission electron microscope)-EDS (energy-dispersive X-ray spectroscopy) line analysis is performed in the stacking direction, the atomic concentration of the additive metal element(s) therein in total is equal to or higher than the average atomic concentration across the internal electrode layers 12. It should be noted that, here, measurement in the STEM-EDS line analysis is performed at a magnification of 10 million times. Also, the segregation layers 31 have a thickness of 10 nm or less, for example.

Figure 5A:
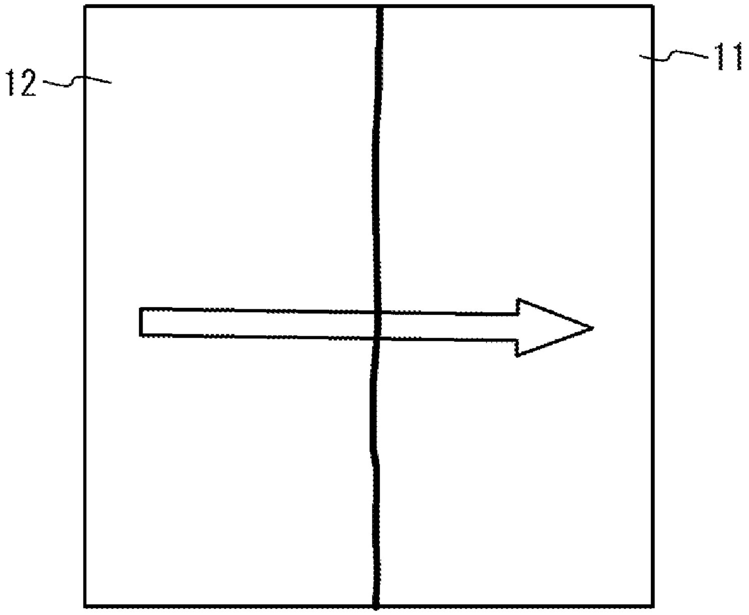
FIGS. 5A and 5B show an example of STEM-EDS line analysis result at the interface between a dielectric layer and an internal electrode layer.
Figure 5B:
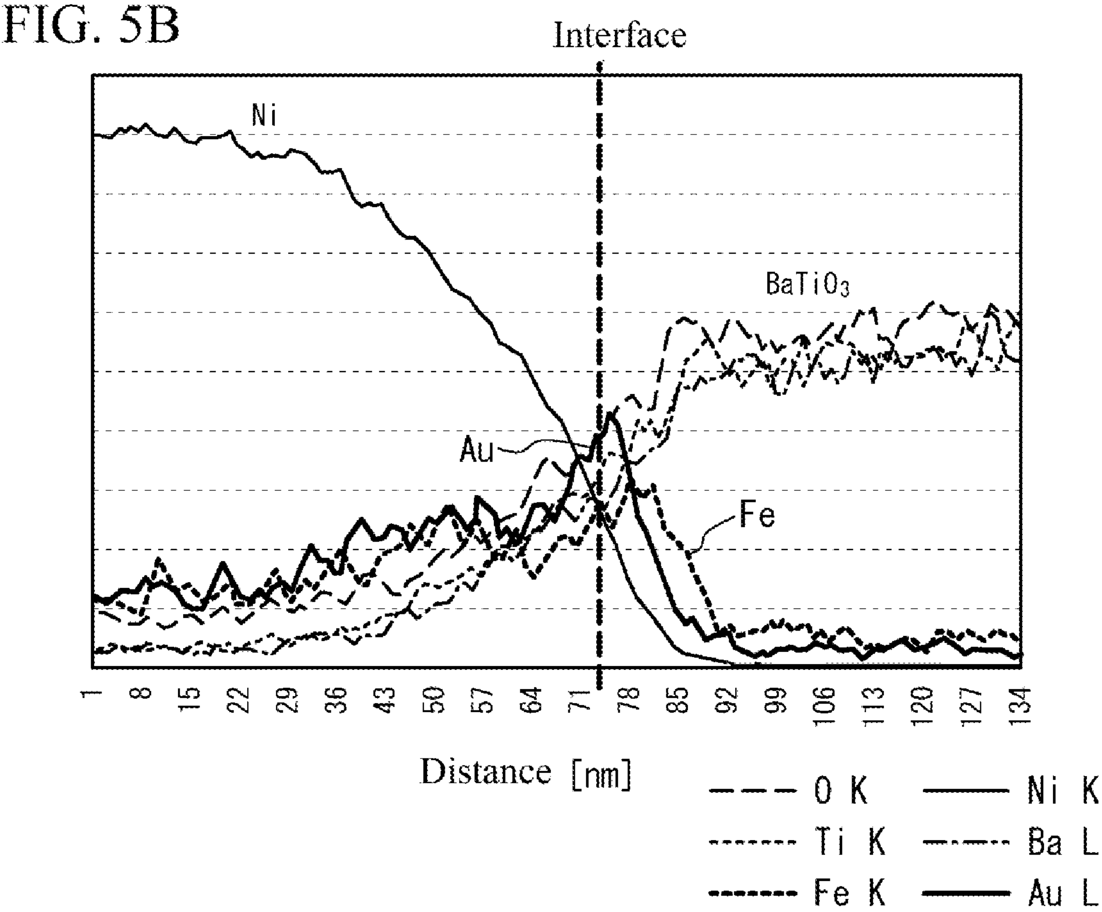

FIG. 5A and FIG. 5B show an example of STEM-EDS line analysis result at the interface between a dielectric layer 11 and an internal electrode layer 12 when $BaTiO_3$ is used as the primary component ceramic of the dielectric layer 11, while Ni is used as the primary component metal of, and Au and Fe are used as two types of additive metal elements in, the internal electrode layer 12. As illustrated in FIG. 5A, the analysis covers from a prescribed position in the internal electrode layer 12 to a prescribed position in the dielectric layer 11. As illustrated in FIG. 5B, the concentration of Ni decreases gradually, while the concentration of $BaTiO_3$ increases gradually, toward the dielectric layer 11 (in this disclosure, in some embodiments, the term "gradually" refers to "continuously when a regression line is obtained by, e.g., the method of least squares). The position at which the signals of Ni and Ti cross each other can be defined as the interface between the dielectric layer 11 and the internal electrode layer 12. Peaks in the concentrations of Au and Fe are seen near this interface. This indicates that a segregation layer 31 containing Au and Fe has formed at the interface between the dielectric layer 11 and the internal electrode layer 12.

Providing segregation layers 31 at the interfaces between the dielectric layers 11 and the internal electrode layers 12 will create stronger Schottky barriers, thereby improving service life of the multilayer ceramic capacitor 100. The segregation layers 31 need not be provided across the entire interfaces between the internal electrode layers 12 and the dielectric layers 11, but they need to be provided at the interfaces at least partially. However, the segregation layers 31 are provided preferably in more than half the interfaces, more preferably across the entire interfaces between the internal electrode layers 12 and the dielectric layers 11.

Also, as illustrated in FIG. 4, the dielectric layers 11 have a constitution where multiple dielectric grains 32 are sintered via grain boundaries. The dielectric grains 32 have, for example, a core-shell structure comprising a core part 32*a* and a shell part 32*b*, for example. A liquid phase component 33 is added to the dielectric layers 11 to lower the sintering temperature. The liquid phase component is a component that turns into a liquid phase during the course of sintering and will become a solid phase once the sintering is completed and the temperature drops. As illustrated in FIG. 4, the liquid phase component 33 is formed at the grain boundaries of the dielectric grains 32. The liquid phase component 33 contains Si. For example, the liquid phase component is a non-crystalline phase whose primary material is $SiO_2$. The liquid phase component 33 may contain Li, B, Na, K, Ca (calcium), etc. The liquid phase component 33 functions as a sintering additive at the grain boundaries of the dielectric grains 32 and is used for densifying the dielectric grains 32 and adjusting the grain growth temperature.

Additionally, an additive metal element component 34 containing the additive metal element(s) added to the internal electrode layers 12 is/are also provided at the grain boundaries of the dielectric grains 32. In other words, the additive metal element component 34 is present at the same positions as the liquid phase component 33 or at positions adjoining the liquid phase component 33. Because segregation layers constituted by the liquid phase component 33 and the additive metal element component 34 are distributed throughout the dielectric layers 11 (i.e., throughout the grain boundaries), the sinterability of the ceramic body can be improved and the sintering period shortened.

Figure 6A:
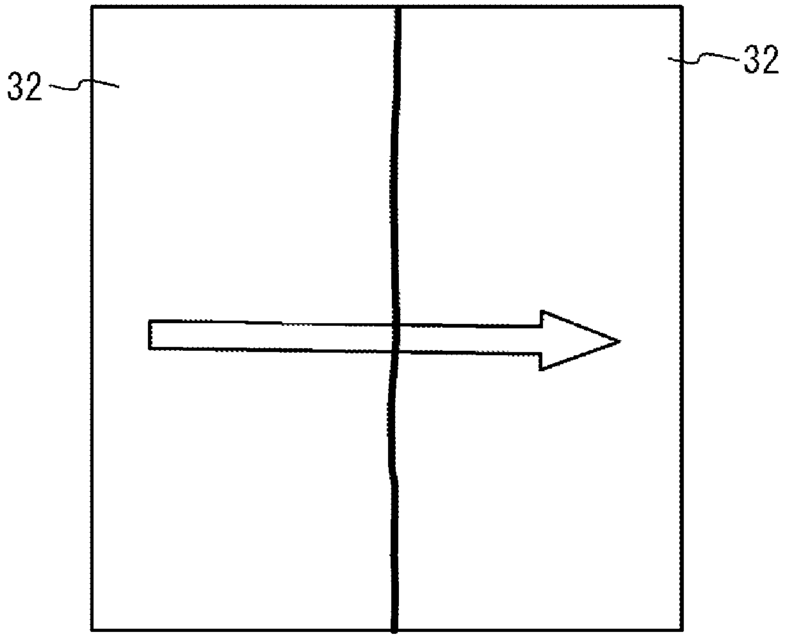
FIGS. 6A and 6B show an example of STEM-EDS line analysis result near the grain boundary of two dielectric grains.
Figure 6B:
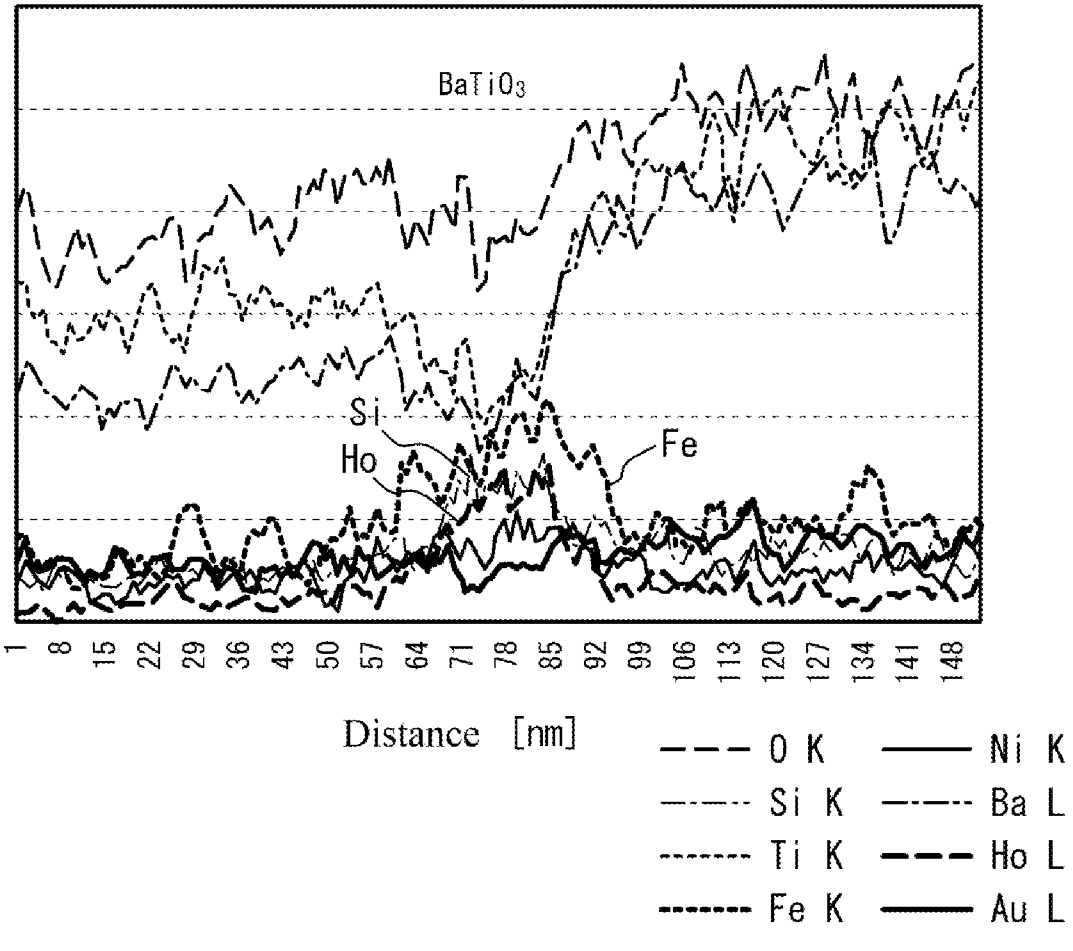

FIG. 6A and FIG. 6B show an example of STEM-EDS line analysis result near the grain boundary of two dielectric grains 32 when $BaTiO_3$ is used as the primary component ceramic of the dielectric layer 11, while Ni is used as the primary component metal of, and Au and Fe are used as two types of additive metal elements in, the internal electrode layer 12. As illustrated in FIG. 6A, the analysis covers from a prescribed position in one dielectric grain 32 to a prescribed position in the other dielectric grain 32. As illustrated in FIG. 6B, there exists a peak (which is a peak when obtaining a regression line regardless of multiple small peaks present in FIG. 6B) in the concentration of Si that gradually increases and then decreases in the direction of measurement. The vicinity of the position of this peak represents a grain boundary (a start and an end of the grain boundary can be determined based on a start and an end of the peak concentration of Si). There exist, near the grain boundary, a peak in the concentration of Fe that gradually increases and then decreases, as well as a peak in the concentration of Au that gradually increases and then decreases. Clearly, peaks in the concentrations of the additive metal elements added to the internal electrode layers 12 also exist at the grain boundaries of the dielectric grains 32. This shows that each additive metal element component 34 has formed at the grain boundaries of the dielectric grains 32.

In this embodiment, the atomic concentration ratio of additive metal element(s)/Si, or specifically the ratio of the atomic concentration of the additive metal element(s) and the atomic concentration of Si, is 1.3 or higher at the grain boundary of at least two adjoining dielectric grains 32 in at least one dielectric layer 11. The atomic concentration ratio of additive metal element(s)/Si, or specifically the ratio of the atomic concentration of the additive metal element(s) and the atomic concentration of Si, refers to the ratio of peak concentrations (highest atomic concentrations) of the additive metal element(s) in total and Si in line analysis. According to this constitution, the additive metal element(s) is/are unevenly distributed at a higher concentration than Si, which is a liquid phase component, in at least one part of the grain boundary of the dielectric grains 32. As a result, segregation layers 31 can be formed stably at the interfaces between the dielectric layers 11 and the internal electrode layers 12. Additionally, segregation layers containing the additive metal element(s) are also formed at the grain boundaries of the dielectric grains 32, which will create stronger double Schottky barriers at the grain boundaries and therefore achieve a higher level of reliability. It should be noted that, if multiple types of additive metal elements are added to the internal electrode layers 12, the atomic concentration of "additive metal element(s)" in "atomic concentration ratio of additive metal element(s)/Si" represents the atomic concentration of the total of these multiple types of additive metal elements.

It should be noted that, if the aforementioned STEM-EDS line analysis is performed between two dielectric grains 32 sandwiching a grain boundary, the concentration peaks of the additive metal element(s) may appear at the same position as, or they may appear at different positions from, the concentration peak of Si.

From the viewpoint of segregating the additive metal element(s) at a higher concentration at the grain boundaries of the dielectric grains 32, the aforementioned atomic concentration ratio of additive metal element(s)/Si is preferably 1.6 or higher, or more preferably 1.9 or higher.

It should be noted that, if the amount of the liquid phase component 33 is too little in the dielectric layers 11, permeation of the liquid phase component 33 will be delayed and become uneven during the course of sintering, possibly making the formation of segregation layers 31 also uneven. For this reason, preferably a lower limit is set for the amount of the liquid phase component 33 in the dielectric layers 11. In this embodiment, the concentration of Si in the dielectric layers 11 is preferably 0.1 at % or more, or more preferably 0.2 at % or more, or yet more preferably 0.3 at % or more, when it is assumed that the B-site element of the primary component ceramic accounts for 100 at %. If the primary component ceramic is barium titanate, the B-site element is Ti.

On the other hand, if the amount of the liquid phase component 33 in the dielectric layers 11 is too much, excessive progression of liquid phase sintering will cause the segregation layer component to elute to the liquid phase, possibly preventing clear segregation layers 31 from forming. Furthermore, the internal structures may become more uneven due to excessive sintering of the internal electrode layers 12, abnormal grain growth in the dielectric layers 11, and so on. For this reason, preferably an upper limit is set for the amount of the liquid phase component 33 in the dielectric layers 11. In this embodiment, the concentration of Si in the dielectric layers 11 is preferably 5.0 at % or less, or more preferably 4 at % or less, or yet more preferably 3 at % or less, when it is assumed that the B-site element of the primary component ceramic accounts for 100 at %.

The Si concentration relative to the B-site element can be estimated from the weight ratio of raw material powders at blending. Additionally, the Si concentration relative to the B-site element can also be measured from the sintered compact based on laser ablation inductively coupled plasma mass spectrometry (LA-ICP-MS). The measurement can be performed by irradiating a laser beam at a diameter of 10 μm and spot intervals of 20 μm onto a polished cross-section of the sintered compact that has been embedded in a resin, analyzing based on LA-ICP-MS the element composition of fine grains that have vaporized, and then averaging the analyzed values taken at five or more locations.

Also, in a high-capacity multilayer ceramic capacitor whose dielectric layers 11 are thin, the interfaces between the dielectric layers 11 and the internal electrode layers 12 have significant effects on inhibiting a tunneling current from generating, which affects reliability, caused by migration and accumulation of oxygen defects. For this reason, it is effective that at least one or more dielectric grain(s) 32 contacting each internal electrode layer 12 is/are covered around its/their outer periphery by the liquid phase component 33 at the same position as, or a position contacting, the additive metal element component 34, and that stable interfaces of the additive metal element component 34 are thus formed. Also, covering the surface layers of dielectric grains 32 with the liquid phase component 33 is effective in reducing leak current because the dielectric resistance at the grain boundaries will increase. It should be noted that, when the multilayer ceramic capacitor 100 is impressed with bias voltage, local electric fields are applied to the grain boundary parts and therefore accumulated oxygen defects near the grain boundaries will increase the likelihood of dielectric degradation; by introducing the additive metal element component 34 to the grain boundaries, however, stronger double Schottky barriers can be created at the grain boundaries to achieve a high level of reliability while reducing leak current at the same time.

From the viewpoint of creating sufficiently strong Schottky barriers, preferably a lower limit is provided for the total concentration of the additive metal element(s) in the segregation layers 31. For example, the concentration of the additive metal element(s) in the segregation layers 31 is preferably no less than 1.2 times, or more preferably no less than 1.5 times, or yet more preferably no less than twice, the additive metal element concentration in the non-segregated parts, other than the segregation layers 31, of the internal electrode layers 12. From the viewpoint of increasing the additive metal element concentration throughout the internal electrode layers 12, the additive metal element concentration throughout the internal electrode layers 12 is preferably 0.01 at % or more, or more preferably 0.05 at % or more, or yet more preferably 0.1 at % or more, based on effective metal concentration. "Effective metal concentration" refers to the atomic concentration percentage of the metal component(s) added to form the internal electrode layers, when the primary component metal of the internal electrode layers 12 accounts for 100 at %.

If the concentration of the additive metal element(s) in the segregation layers 31 is too high, the ESR may increase due to an increase in electrode resistance, or the internal electrodes may become discontinuous or crack due to varying degrees of sinterability or internal stress. For this reason, preferably an upper limit is provided for the concentration of the additive metal element(s) in the segregation layers 31. For example, the concentration of the additive metal element(s) in the segregation layers 31 is preferably no more than 20 times, or more preferably no more than 15 times, or yet more preferably no more than 10 times, the additive metal element concentration in the non-segregated parts, other than the segregation layers 31, of the internal electrode layers 12. From the viewpoint of keeping the additive metal element concentration throughout the internal electrode layers 12 low, the additive metal element concentration throughout the internal electrode layers 12 is preferably 5 at % or more, or more preferably 4 at % or more, or yet more preferably 3 at % or more, based on effective metal concentration.

The per-layer thickness of the dielectric layers 11 is 0.2 μm or more and 10 μm or less, or 0.2 μm or more and 8 μm or less, or 0.2 μm or more and 5 μm or less, for example. In general, the thinner the dielectric layers 11, the more likely the electrical properties fluctuate because they become more likely affected by diffusions of the additive metal element(s) added to the internal electrode layers 12 as well as local oxidation of the internal electrode layers 12. In this embodiment, therefore, a manifestation of greater actions and effects is expected when the dielectric layers 11 are made thinner. The per-layer thickness of the dielectric layers 11 can be measured by mechanically polishing, for example, a cross-section per FIG. 2 of the multilayer ceramic capacitor 100, and then obtaining an average of the thicknesses at randomly selected 10 locations from an image of the cross-section captured with a scanning transmission electron microscope or other microscope.

In each dielectric layer 11, the average grain size of the dielectric grains 32 is preferably 20 nm or more and 600 nm or less, or more preferably 30 nm or more and 500 nm or less, or yet more preferably 40 nm or more and 400 nm or less. Also, the number of dielectric grains per layer is preferably 1 or greater and 30 or smaller, or more preferably 2 or greater and 20 or smaller, or yet more preferably 3 or greater and 10 or smaller.

The per-layer thickness of the internal electrode layers 12 is 0.1 μm or more and 2 μm or less, or 0.2 μm or more and 1 μm or less, or 0.3 μm or more and 0.8 μm or less, for example. The thinner the internal electrode layers 12, the higher their surface ratio becomes, which makes local oxidation more likely, and therefore a manifestation of greater actions and effects is expected in this embodiment. If the thickness of the internal electrode layers 12 falls under 0.05 μm, however, the ratio of the thickness of the segregation layers 31 to the thickness of the internal electrode layers 12 becomes too high and therefore the increase in ESR (equivalent series resistance), as well as effects on oxidation of internal electrodes and sinterability of internal electrodes, may no longer become negligible. The per-layer thickness of the internal electrode layers 12 can be measured by mechanically polishing, for example, a cross-section per FIG. 2 of the multilayer ceramic capacitor 100, and then obtaining an average of the thicknesses at randomly selected 10 locations from an image of the cross-section captured with a scanning transmission electron microscope or other microscope.

Preferably there are two or more types of additive metal elements. For example, preferably the additive metal elements include at least two types being a first additive metal element and a second additive metal element.

Note that generally metals with low oxidation-reduction potentials are more likely ionized. Therefore, it is considered that additive metal elements with low oxidation-reduction potentials are more likely to dissolve in liquid phase components and diffuse in oxide phases. If the oxidation-reduction potential of the first additive metal element is higher, the segregation layers 31 are more likely to remain at the interfaces between the internal electrode layers 12 and the dielectric layers 11, which facilitates a uniform formation of segregation layers 31 at the interfaces. On the other hand, if the oxidation-reduction potential difference between the first additive metal element and the second additive metal element is 1.8 V or more, the additive metal element component 34 will preferentially form segregation layers at positions adjoining the segregation layers 31 or on the dielectric layer 11 side thereof, thus stabilizing the segregation layers on the internal electrode layer 12 side and accelerating a segregation layer formation on the dielectric interfaces of the element that is more likely ionized, the result of which is a manifestation of greater effect on service life improvement. Based on the above, preferably the difference between the oxidation-reduction potential of the first additive metal element and the oxidation-reduction potential of the second additive metal element is 1.8 V or more.

Figure 7:
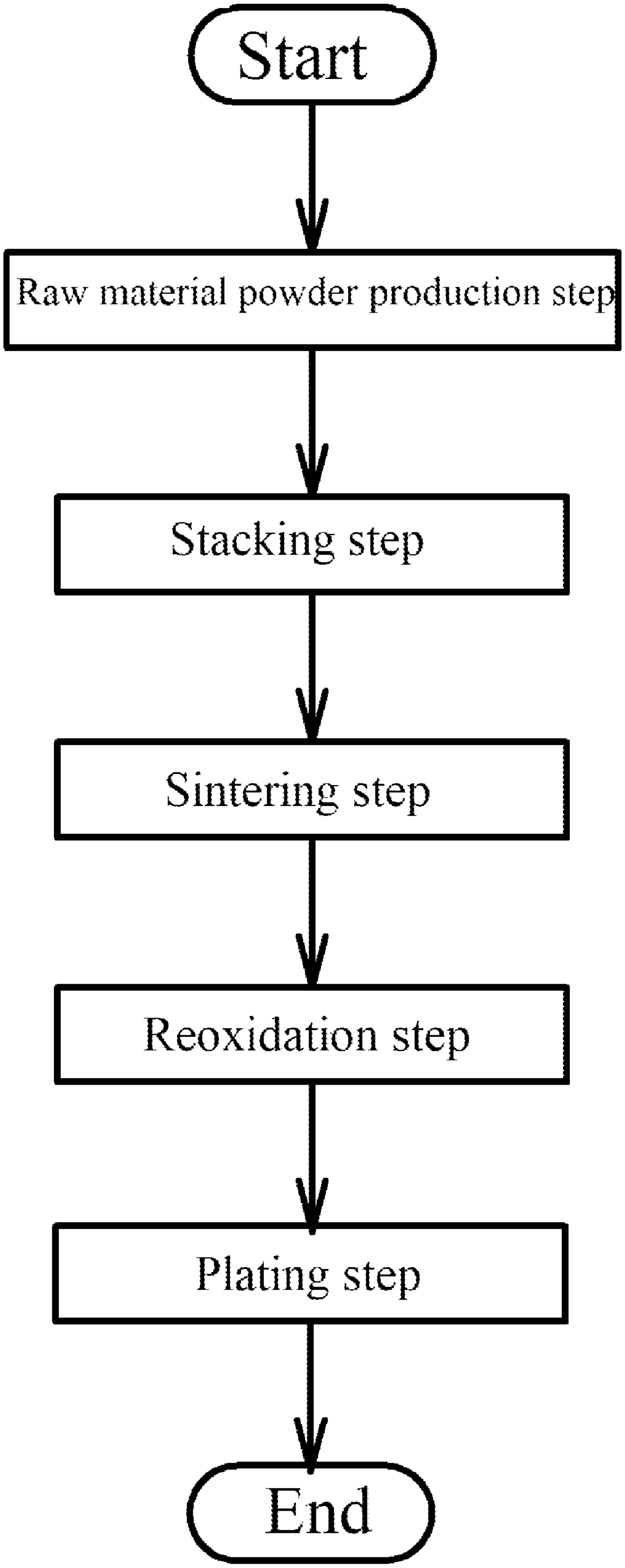
FIG. 7 is a drawing illustrating the flow of how a multilayer ceramic capacitor is manufactured.

Next, how the multilayer ceramic capacitor 100 is manufactured is explained. FIG. 7 is a drawing illustrating the flow of how the multilayer ceramic capacitor 100 is manufactured.

(Raw Material Powder Production Step)

First, a dialectic material with which to form the dielectric layers 11 is prepared. The A-site element and B-site element contained in the dialectic layers 11 are normally contained in the dielectric layers 11 in the form of a sintered compact constituted by $ABO_3$ grains. For example, $BaTiO_3$ is a tetragonal compound having a perovskite structure, and exhibits a high dielectric constant. This $BaTiO_3$ can be obtained, in general, by reacting titanium dioxide or other titanium material with barium carbonate or other barium material and thereby synthesizing barium titanate. Regarding how to synthesize a dialectic powder for the dielectric layers 11, various types of methods are heretofore known; for example, the solid phase method, sol-gel method, hydrothermal method, etc., are known. In this embodiment, any of the foregoing can be adopted.

Prescribed additive compounds are added to the obtained dielectric powder according to the purpose. The additive compounds include oxides of Mo, Nb, Ta, W, Mg, Mn, V, Cr, and rare earth elements (Y, Sm, Eu, Gd, Tb, Dy, Ho, Er, Tm, and Yb), or oxides containing Co, Ni, Li, B, Na, K, or Si, or glass containing Co, Ni, Li, B, Na, K, or Si. Of these, primarily $SiO_2$ functions as a sintering additive.

For example, the dielectric powder and additive compounds are wet-mixed and then dried and pulverized to prepare a ceramic material. For example, the ceramic material obtained as described above may be pulverized as necessary to adjust the grain size, or this may be combined with a classification process to regulate the grain size. A dielectric material is obtained from the above steps.

It should be noted that, to achieve uniform placements of $SiO_2$ between the dielectric powder grains, the average size of the $SiO_2$ grains is preferably kept to, or less than, the average size of the dielectric powder grains, or more preferably kept to, or less than, one-quarter of the average size of the dielectric powder grains. Also, by assuming that the B-site element of the primary component ceramic accounts for 100 at % in the dielectric material, preferably the concentration of Si is kept to 0.1 at % or higher and 5.0 at % or lower.

(Stacking Step)

Next, polyvinyl butyral (PVB) resin or other binder, ethanol, toluene, or other organic solvent, and plasticizer, are added to the obtained dielectric material and the ingredients are wet-mixed. Using the obtained slurry, dielectric green sheets 52 are coated on base material 51 according to the die coater method or doctor blade method, for example, and then dried. The base material 51 is polyethylene terephthalate (PET) films, for example.

Figure 8A:
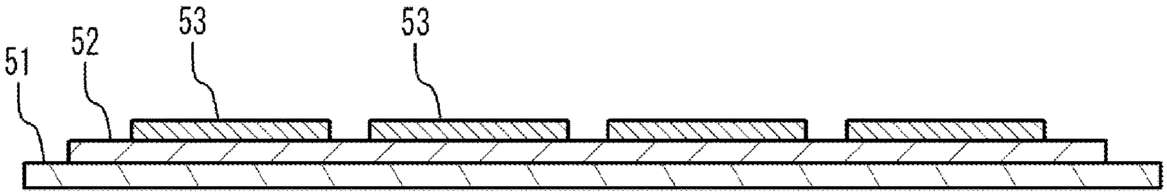
FIGS. 8A and 8B are drawings illustrating a stacking step.

Next, as illustrated in FIG. 8A, internal electrode patterns 53 are formed as films on the dielectric green sheets 52. FIG. 8A shows an example where four layers of internal electrode patterns 53 are formed as films, with prescribed intervals kept in between, on a dielectric green sheet 52. The green sheets 52 on which the internal electrode patterns 53 have been printed represent stacking units. An organic metal complex solution containing an additive metal element(s), or fine powder containing the additive metal element(s), is added to each internal electrode pattern 53. The additive metal element(s) may be in single-metal, alloy, oxide, or other form. Also, in terms of how to introduce the additive metal element(s), the internal electrode patterns 53 may use a primary component metal whose surface has been coated with the additive metal element(s). As the additive metal element(s), one, or two or more types selected from Au, Sn, Cr, Fe, Y, In, As, Co, Cu, Ir, Mg, Os, Pd, Pt, Re, Rh, Ru, Se, Te, W, Zn, Ag, Mo, and Ge is/are added.

Also, in order to diffuse the additive metal element component 34 inside the dielectric layers 11, the average grain size of the additive metal element(s) is kept to preferably 500 nm or less, or more preferably 300 nm or less, or yet more preferably 200 nm or less.

If there is too little of the additive metal element(s), the segregation layers 31 may not be formed sufficiently. For this reason, preferably a lower limit is provided for the additive amount of the additive metal element(s). For example, the additive amount of the additive metal element(s) is such that, based on effective metal concentration, preferably 0.01 at % or more, or more preferably 0.05 at % or more, or yet more preferably 0.1 at % or more, of the additive metal element(s) is added relative to the primary component metal of the internal electrode patterns 53.

If there is too much of the additive metal element(s), on the other hand, the effects such as diffusion of the additive metal element(s) to the dielectric layers 11, oxidation of the internal electrode layers 12, drop in sinterability of the internal electrode layers 12, etc., may become no longer negligible. For this reason, preferably an upper limit is provided for the additive amount of the additive metal element(s). For example, the additive amount of the additive metal element(s) is such that, based on effective metal concentration, preferably 5.0 at % or less, or more preferably 4.0 at % or less, or yet more preferably 3.0 at % or less, of the additive metal element(s) is added relative to the primary component metal of the internal electrode patterns 53.

Figure 8B:
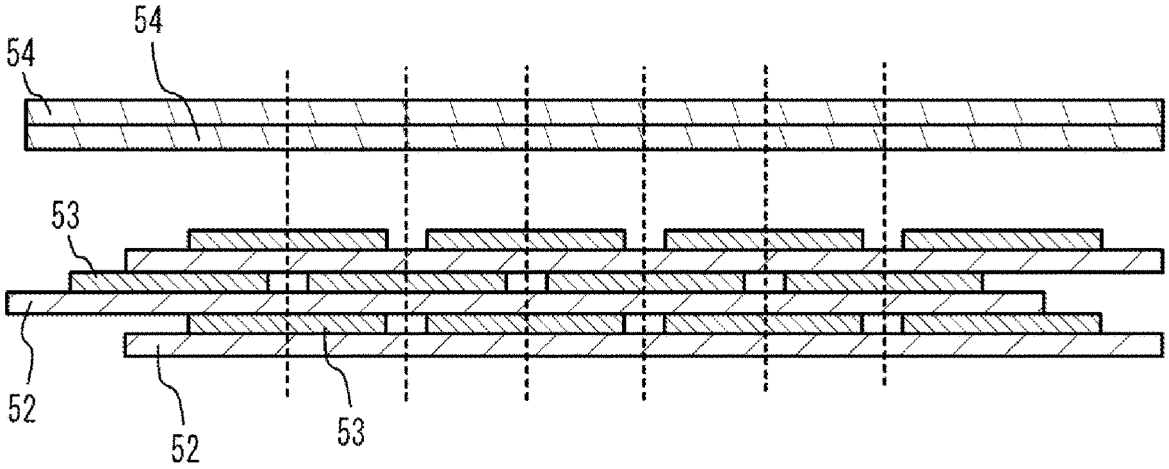

Next, the dielectric green sheets 52 are peeled from the base material 51, and simultaneously the stacking units are stacked, as illustrated in FIG. 8B. Next, cover sheets 54 are stacked by a prescribed number (such as 2 to 10 layers) on top and bottom of the multilayer body obtained from stacking the stacking units, and then thermally bonded, after which the multilayer body is cut to prescribed chip dimensions (such as 1.0 mm×0.5 mm). In the example of FIG. 8B, it is cut along the dotted lines. The cover sheets 54 may have the same components as, or different additive compounds from, the dielectric green sheets 52.

(Sintering Step)

The thus-obtained ceramic multilayer body is put through a binder removal process in a $N_2$ atmosphere, after which a metal paste that will constitute the base layers for the external electrodes 20$a$, 20$b$ is applied according to the dip method, followed by sintering at 1100 to 1300° C. in a reducing atmosphere of $10^{-5}$ to $10^{-8}$ atm in oxygen partial pressure. In doing so, the rate of temperature rise is kept to 50° C./min or lower from 300° C. to 900° C. to allow any binder removal residue to be removed fully, while the rate of temperature rise is kept to 200° C./min or higher from 900° C. to the maximum sintering temperature to inhibit spheroidization caused by excessive sintering of the internal electrodes, while promoting even placement of the liquid phase component at the dielectric grain boundaries. Here, giving excessive thermal energy may result in discharge of the liquid phase component to the space created as a result of the internal electrodes becoming discontinuous, or in discharge of the liquid phase component to triple junctions from the grain boundaries due to grain growth of the dielectric grains. The multilayer ceramic capacitor 100 is thus obtained.

(Reoxidation Step)

Subsequently, a reoxidation process may be performed at 600° C. to 1000° C. in a $N_2$ gas atmosphere.

(Plating Step)

Subsequently, the external electrodes 20$a$, 20$b$ may be given a metal coating of Cu, Ni, Sn, etc., through a plating process.

It should be noted that, while a multilayer ceramic capacitor was explained as an example of ceramic electronic component in each of the aforementioned embodiments, the present invention is not limited to the foregoing. For example, a varistor, thermistor or other electronic component may be used.

EXAMPLES

Multilayer ceramic capacitors pertaining to the embodiments were produced and their properties were examined below.

Example 1

Stacking units on which a Ni paste containing Ni powder had been printed as internal electrode patterns, were stacked on dielectric green sheets containing barium titanate as a dielectric material and also containing a sintering additive, after which the stacking units were pressure-bonded, cut, removed of binder, and sintered, to produce a multilayer chip having a chip shape of 1.0 mm×0.5 mm×0.5 mm. The thickness of the dielectric layers was 0.8 μm, thickness of the internal electrode layers was 0.5 μm, and number of layers stacked was 470 layers for the dielectric layers and also 470 layers for the internal electrode layers.

In Example 1, Au and Fe were added as additive metal elements to the Ni paste for the internal electrode patterns. Au was added by 1.0 at %, and Fe was added by 1.0 at %, relative to Ni. During the course of sintering, segregation layers containing these additive metal elements were formed at the interfaces between the internal electrode layers and the dielectric layers. $SiO_2$ was added to the dielectric green sheets as a sintering additive. In the dielectric green sheets, the additive amount of Si relative to Ti was set to 1.5 at %.

STEM-EDS measurement of the vicinity of the interfaces between the internal electrode layers and the dielectric layers confirmed that segregation layers containing the additive metal elements had formed over a thickness range of 10 nm or less at the interfaces between the internal electrode layers and the dielectric layers. STEM-EDS measurement of the vicinity of the grain boundaries of the dielectric layers detected Si, Au, and Fe at the grain boundaries of the dielectric layers. Au and Fe had also been allocated on the dielectric grains, confirming that segregation layers containing the additive metal elements had also formed at the dielectric grain boundaries.

At the dielectric grain boundaries, the atomic concentration ratio of additive metal elements/liquid phase component (=(Au+Fe)/Si) was 1.6.

Example 2

In Example 2, Au and Fe were added as additive metal elements to the Ni paste for the internal electrode patterns. Au was added by 1.0 at %, and Fe was added by 1.0 at %, relative to Ni. During the course of sintering, segregation layers containing these additive metal elements were formed at the interfaces between the internal electrode layers and the dielectric layers. $SiO_2$ was added to the dielectric green sheets as a sintering additive. In the dielectric green sheets, the additive amount of Si relative to Ti was set to 5.0 at %.

STEM-EDS measurement of the vicinity of the interfaces between the internal electrode layers and the dielectric layers confirmed that segregation layers containing the additive metal elements had formed over a thickness range of 10 nm or less at the interfaces between the internal electrode layers and the dielectric layers. STEM-EDS measurement of the vicinity of the grain boundaries of the dielectric layers detected Si, Au, and Fe at the grain boundaries of the dielectric layers. Au and Fe had also been allocated on the dielectric grains, confirming that segregation layers containing the additive metal elements had also formed at the dielectric grain boundaries.

At the dielectric grain boundaries, the atomic concentration ratio of additive metal elements/liquid phase component (=(Au+Fe)/Si) was 1.3.

Example 3

In Example 3, Au and Fe were added as additive metal elements to the Ni paste for the internal electrode patterns. Au was added by 1.0 at %, and Fe was added by 1.0 at %, relative to Ni. During the course of sintering, segregation layers containing these additive metal elements were formed at the interfaces between the internal electrode layers and the dielectric layers. $SiO_2$ was added to the dielectric green sheets as a sintering additive. In the dielectric green sheets, the additive amount of Si relative to Ti was set to 0.1 at %.

STEM-EDS measurement of the vicinity of the interfaces between the internal electrode layers and the dielectric layers confirmed that segregation layers containing the additive metal elements had formed over a thickness range of 10 nm or less at the interfaces between the internal electrode layers and the dielectric layers. STEM-EDS measurement of the vicinity of the grain boundaries of the dielectric layers detected Si, Au, and Fe at the grain boundaries of the dielectric layers. Au and Fe had also been allocated on the dielectric grains, confirming that segregation layers containing the additive metal elements had also formed at the dielectric grain boundaries.

At the dielectric grain boundaries, the atomic concentration ratio of additive metal elements/liquid phase component (=(Au+Fe)/Si) was 3.1.

Example 4

In Example 4, Fe was added as an additive metal element to the Ni paste for the internal electrode patterns. Fe was added by 1.0 at % relative to Ni. During the course of sintering, segregation layers containing the additive metal element (Fe) were formed at the interfaces between the internal electrode layers and the dielectric layers. $SiO_2$ was added to the dielectric green sheets as a sintering additive. In the dielectric green sheets, the additive amount of Si relative to Ti was set to 1.5 at %.

STEM-EDS measurement of the vicinity of the interfaces between the internal electrode layers and the dielectric layers confirmed that segregation layers containing the additive metal element had formed over a thickness range of 10 nm or less at the interfaces between the internal electrode layers and the dielectric layers. STEM-EDS measurement of the vicinity of the grain boundaries of the dielectric layers detected Si and Fe at the grain boundaries of the dielectric layers. Fe had also been allocated on the dielectric grains, confirming that segregation layers containing the additive metal element had also formed at the dielectric grain boundaries.

At the dielectric grain boundaries, the atomic concentration ratio of additive metal element/liquid phase component (=Fe/Si) was 2.

Example 5

In Example 5, Cr was added as an additive metal element to the Ni paste for the internal electrode patterns. Cr was added by 1.0 at % relative to Ni. During the course of sintering, segregation layers containing these additive metal elements were formed at the interfaces between the internal electrode layers and the dielectric layers. $SiO_2$ was added to the dielectric green sheets as a sintering additive. In the dielectric green sheets, the additive amount of Si relative to Ti was set to 1.5 at %.

STEM-EDS measurement of the vicinity of the interfaces between the internal electrode layers and the dielectric layers confirmed that segregation layers containing the additive metal element had formed over a thickness range of 10 nm or less at the interfaces between the internal electrode layers and the dielectric layers. STEM-EDS measurement of the vicinity of the grain boundaries of the dielectric layers detected Si and Cr at the grain boundaries of the dielectric layers. Cr had also been allocated on the dielectric grains, confirming that segregation layers containing the additive metal element had also formed at the dielectric grain boundaries.

At the dielectric grain boundaries, the atomic concentration ratio of additive metal element/liquid phase component (=Cr/Si) was 1.7.

Example 6

In Example 6, Zn was added as an additive metal element to the Ni paste for the internal electrode patterns. Zn was added by 1.0 at % relative to Ni. During the course of sintering, segregation layers containing the additive metal element (Zn) were formed at the interfaces between the internal electrode layers and the dielectric layers. $SiO_2$ was added to the dielectric green sheets as a sintering additive. In the dielectric green sheets, the additive amount of Si relative to Ti was set to 1.5 at %.

STEM-EDS measurement of the vicinity of the interfaces between the internal electrode layers and the dielectric layers confirmed that segregation layers containing the additive metal element had formed over a thickness range of 10 nm or less at the interfaces between the internal electrode layers and the dielectric layers. STEM-EDS measurement of the vicinity of the grain boundaries of the dielectric layers detected Si and Zn at the grain boundaries of the dielectric layers. Zn had also been allocated on the dielectric grains, confirming that segregation layers containing the additive metal element had also formed at the dielectric grain boundaries.

At the dielectric grain boundaries, the atomic concentration ratio of additive metal element/liquid phase component (=Zn/Si) was 1.3.

Example 7

In Example 7, Ge was added as an additive metal element to the Ni paste for the internal electrode patterns. Ge was added by 1.0 at % relative to Ni. During the course of sintering, segregation layers containing the additive metal element (Ge) were formed at the interfaces between the internal electrode layers and the dielectric layers. $SiO_2$ was added to the dielectric green sheets as a sintering additive. In the dielectric green sheets, the additive amount of Si relative to Ti was set to 1.5 at %.

STEM-EDS measurement of the vicinity of the interfaces between the internal electrode layers and the dielectric layers confirmed that segregation layers containing the additive metal element had formed over a thickness range of 10 nm or less at the interfaces between the internal electrode layers and the dielectric layers. STEM-EDS measurement of the vicinity of the grain boundaries of the dielectric layers detected Si and Ge at the grain boundaries of the dielectric layers. Ge had also been allocated on the dielectric grains, confirming that segregation layers containing the additive metal element had also formed at the dielectric grain boundaries.

At the dielectric grain boundaries, the atomic concentration ratio of additive metal element/liquid phase component (=Ge/Si) was 1.3.

Example 8

In Example 8, Au and Cr were added as additive metal elements to the Ni paste for the internal electrode patterns. Au was added by 1.0 at %, and Cr was added by 1.0 at %, relative to Ni. During the course of sintering, segregation layers containing these additive metal elements were formed at the interfaces between the internal electrode layers and the dielectric layers. $SiO_2$ was added to the dielectric green sheets as a sintering additive. In the dielectric green sheets, the additive amount of Si relative to Ti was set to 1.5 at %.

STEM-EDS measurement of the vicinity of the interfaces between the internal electrode layers and the dielectric layers confirmed that segregation layers containing the additive metal elements had formed over a thickness range of 10 nm or less at the interfaces between the internal electrode layers and the dielectric layers. STEM-EDS measurement of the vicinity of the grain boundaries of the dielectric layers detected Si, Au, and Cr at the grain boundaries of the dielectric layers. Au and Cr had also been allocated on the dielectric grains, confirming that segregation layers containing the additive metal elements had also formed at the dielectric grain boundaries.

At the dielectric grain boundaries, the atomic concentration ratio of additive metal elements/liquid phase component (=(Au+Cr)/Si) was 2.2.

Example 9

In Example 9, Au and Zn were added as additive metal elements to the Ni paste for the internal electrode patterns.

Au was added by 1.0 at %, and Zn was added by 1.0 at %, relative to Ni. During the course of sintering, segregation layers containing these additive metal elements were formed at the interfaces between the internal electrode layers and the dielectric layers. $SiO_2$ was added to the dielectric green sheets as a sintering additive. In the dielectric green sheets, the additive amount of Si relative to Ti was set to 1.5 at %.

STEM-EDS measurement of the vicinity of the interfaces between the internal electrode layers and the dielectric layers confirmed that segregation layers containing the additive metal elements had formed over a thickness range of 10 nm or less at the interfaces between the internal electrode layers and the dielectric layers. STEM-EDS measurement of the vicinity of the grain boundaries of the dielectric layers detected Si, Au, and Zn at the grain boundaries of the dielectric layers. Au and Zn had also been allocated on the dielectric grains, confirming that segregation layers containing the additive metal elements had also formed at the dielectric grain boundaries.

At the dielectric grain boundaries, the atomic concentration ratio of additive metal elements/liquid phase component (=(Au+Zn)/Si) was 1.9.

Example 10

In Example 10, Au and Ge were added as additive metal elements to the Ni paste for the internal electrode patterns. Au was added by 1.0 at %, and Ge was added by 1.0 at %, relative to Ni. During the course of sintering, segregation layers containing these additive metal elements were formed at the interfaces between the internal electrode layers and the dielectric layers. $SiO_2$ was added to the dielectric green sheets as a sintering additive. In the dielectric green sheets, the additive amount of Si relative to Ti was set to 1.5 at %.

STEM-EDS measurement of the vicinity of the interfaces between the internal electrode layers and the dielectric layers confirmed that segregation layers containing the additive metal elements had formed over a thickness range of 10 nm or less at the interfaces between the internal electrode layers and the dielectric layers. STEM-EDS measurement of the vicinity of the grain boundaries of the dielectric layers detected Si, Au, and Ge at the grain boundaries of the dielectric layers. Au and Ge had also been allocated on the dielectric grains, confirming that segregation layers containing the additive metal elements had also formed at the dielectric grain boundaries.

At the dielectric grain boundaries, the atomic concentration ratio of additive metal elements/liquid phase component (=(Au+Ge)/Si) was 1.6.

Example 11

In Example 11, Au and In were added as additive metal elements to the Ni paste for the internal electrode patterns. Au was added by 1.0 at %, and In was added by 1.0 at %, relative to Ni. During the course of sintering, segregation layers containing these additive metal elements were formed at the interfaces between the internal electrode layers and the dielectric layers. $SiO_2$ was added to the dielectric green sheets as a sintering additive. In the dielectric green sheets, the additive amount of Si relative to Ti was set to 5.0 at %.

STEM-EDS measurement of the vicinity of the interfaces between the internal electrode layers and the dielectric layers confirmed that segregation layers containing the additive metal elements had formed over a thickness range of 10 nm or less at the interfaces between the internal electrode layers and the dielectric layers. STEM-EDS measurement of the vicinity of the grain boundaries of the dielectric layers detected Si, Au, and In at the grain boundaries of the dielectric layers. Au and In had also been allocated on the dielectric grains, confirming that segregation layers containing the additive metal elements had also formed at the dielectric grain boundaries.

At the dielectric grain boundaries, the atomic concentration ratio of additive metal elements/liquid phase component (=(Au+In)/Si) was 1.3.

Example 12

In Example 12, Fe and Cr were added as additive metal elements to the Ni paste for the internal electrode patterns. Fe was added by 1.0 at %, and Cr was added by 1.0 at %, relative to Ni. During the course of sintering, segregation layers containing these additive metal elements were formed at the interfaces between the internal electrode layers and the dielectric layers. $SiO_2$ was added to the dielectric green sheets as a sintering additive. In the dielectric green sheets, the additive amount of Si relative to Ti was set to 1.5 at %.

STEM-EDS measurement of the vicinity of the interfaces between the internal electrode layers and the dielectric layers confirmed that segregation layers containing the additive metal elements had formed over a thickness range of 10 nm or less at the interfaces between the internal electrode layers and the dielectric layers. STEM-EDS measurement of the vicinity of the grain boundaries of the dielectric layers detected Si, Fe, and Cr at the grain boundaries of the dielectric layers. Fe and Cr had also been allocated on the dielectric grains, confirming that segregation layers containing the additive metal elements had also formed at the dielectric grain boundaries.

At the dielectric grain boundaries, the atomic concentration ratio of additive metal elements/liquid phase component (=(Fe+Cr)/Si) was 2.2.

Comparative Example 1

In Comparative Example 1, no additive metal element was added to the Ni paste for the internal electrode patterns. Other conditions were kept the same as in Example 1.

Comparative Example 2

In Comparative Example 2, Au was added as an additive metal element to the Ni paste for the internal electrode patterns. Au was added by 0.1 at % relative to Ni. During the course of sintering, segregation layers containing the additive metal element (Au) were formed at the interfaces between the internal electrode layers and the dielectric layers. $SiO_2$ was added to the dielectric green sheets as a sintering additive. In the dielectric green sheets, the additive amount of Si relative to Ti was set to 1.5 at %.

STEM-EDS measurement of the vicinity of the interfaces between the internal electrode layers and the dielectric layers confirmed that segregation layers containing the additive metal element had formed over a thickness range of 10 nm or less at the interfaces between the internal electrode layers and the dielectric layers. STEM-EDS measurement of the vicinity of the grain boundaries of the dielectric layers detected Si and Au at the grain boundaries of the dielectric layers. Au had also been allocated on the dielectric grains, confirming that segregation layers containing the additive metal element had also formed at the dielectric grain boundaries.

At the dielectric grain boundaries, the atomic concentration ratio of additive metal element/liquid phase component (=Au/Si) was 0.05.

Comparative Example 3

In Comparative Example 3, Au was added as an additive metal element to the Ni paste for the internal electrode patterns. Au was added by 1.0 at % relative to Ni. During the course of sintering, segregation layers containing the additive metal element (Au) were formed at the interfaces between the internal electrode layers and the dielectric layers. $SiO_2$ was added to the dielectric green sheets as a sintering additive. In the dielectric green sheets, the additive amount of Si relative to Ti was set to 1.5 at %.

STEM-EDS measurement of the vicinity of the interfaces between the internal electrode layers and the dielectric layers confirmed that segregation layers containing the additive metal element had formed over a thickness range of 10 nm or less at the interfaces between the internal electrode layers and the dielectric layers. STEM-EDS measurement of the vicinity of the grain boundaries of the dielectric layers detected Si and Au at the grain boundaries of the dielectric layers. Au had also been allocated on the dielectric grains, confirming that segregation layers containing the additive metal element had also formed at the dielectric grain boundaries.

At the dielectric grain boundaries, the atomic concentration ratio of additive metal element/liquid phase component (=Au/Si) was 0.08.

Comparative Example 4

In Comparative Example 4, Au and Fe were added as additive metal elements to the Ni paste for the internal electrode patterns. Au was added by 1.0 at %, and Fe was added by 1.0 at %, relative to Ni. During the course of sintering, segregation layers containing these additive metal elements were formed at the interfaces between the internal electrode layers and the dielectric layers. $SiO_2$ was added to the dielectric green sheets as a sintering additive. In the dielectric green sheets, the additive amount of Si relative to Ti was set to 6.0 at %.

STEM-EDS measurement of the vicinity of the interfaces between the internal electrode layers and the dielectric layers confirmed that segregation layers containing the additive metal elements had formed over a thickness range of 10 nm or less at the interfaces between the internal electrode layers and the dielectric layers. STEM-EDS measurement of the vicinity of the grain boundaries of the dielectric layers detected Si, Au, and Fe at the grain boundaries of the dielectric layers. Au and Fe had also been allocated on the dielectric grains, confirming that segregation layers containing the additive metal elements had also formed at the dielectric grain boundaries.

At the dielectric grain boundaries, the atomic concentration ratio of additive metal elements/liquid phase component (=(Au+Fe)/Si) was 0.09.

Comparative Example 5

In Comparative Example 5, Au and Fe were added as additive metal elements to the Ni paste for the internal electrode patterns. Au was added by 1.0 at %, and Fe was added by 1.0 at %, relative to Ni. During the course of sintering, segregation layers containing these additive metal elements were formed at the interfaces between the internal electrode layers and the dielectric layers. $SiO_2$ was added to the dielectric green sheets as a sintering additive. In the dielectric green sheets, the additive amount of Si relative to Ti was set to 0.05 at %.

STEM-EDS measurement of the vicinity of the interfaces between the internal electrode layers and the dielectric layers confirmed that segregation layers containing the additive metal elements had formed over a thickness range of 10 nm or less at the interfaces between the internal electrode layers and the dielectric layers. STEM-EDS measurement of the vicinity of the grain boundaries of the dielectric layers detected Si, Au, and Fe at the grain boundaries of the dielectric layers. Au and Fe had also been allocated on the dielectric grains, confirming that segregation layers containing the additive metal elements had also formed at the dielectric grain boundaries.

At the dielectric grain boundaries, the atomic concentration ratio of additive metal elements/liquid phase component (=(Au+Fe)/Si) was 0.12.

The respective conditions in Examples 1 to 12 and Comparative Examples 1 to 5 are shown in Table 1. It should be noted that Table 1 shows the oxidation-reduction potential of each additive metal element. To be specific, the oxidation-reduction potential of Au is 1.52 V, oxidation-reduction potential of Fe is −0.44 V, oxidation-reduction potential of Cr is −0.9 V, oxidation-reduction potential of Zn is −0.76 V, oxidation-reduction potential of Ge is 0.25 V, and oxidation-reduction potential of In is −0.34 V.

TABLE 1

| | Additive metal element | Additive metal element/Ni [at %] | Si/Ti [at %] | Segregation layer | Additive metal element/Si | Oxidation-reduction potential [V] | 50-percentile service life [min] | Determination |
|---|---|---|---|---|---|---|---|---|
| Comparative Example 1 | — | — | 1.5 | — | — | — | 112 | X |
| Comparative Example 2 | Au | 0.1 | 1.5 | ○ | 0.05 | 1.52 | 320 | X |
| Comparative Example 3 | Au | 1.0 | 1.5 | ○ | 0.08 | 1.52 | 670 | X |
| Comparative Example 4 | Au/Fe | 1.0/1.0 | 6.0 | ○ | 0.09 | 1.52/−0.44 | 890 | X |
| Comparative Example 5 | Au/Fe | 1.0/1.0 | 0.05 | ○ | 0.12 | 1.52/−0.44 | 680 | X |
| Example 1 | Au/Fe | 1.0/1.0 | 1.5 | ○ | 1.6 | 1.52/−0.44 | 2514 | ○ |
| Example 2 | Au/Fe | 1.0/1.0 | 5.0 | ○ | 1.3 | 1.52/−0.44 | 1002 | ○ |
| Example 3 | Au/Fe | 1.0/1.0 | 0.1 | ○ | 3.1 | 1.52/−0.44 | 1101 | ○ |
| Example 4 | Fe | 1.0 | 1.5 | ○ | 2 | −0.44 | 1770 | ○ |

TABLE 1-continued

| | Additive metal element | Additive metal element/Ni [at %] | Si/Ti [at %] | Segregation layer | Additive metal element/Si | Oxidation-reduction potential [V] | 50-percentile service life [min] | Determination |
|---|---|---|---|---|---|---|---|---|
| Example 5 | Cr | 1.0 | 1.5 | ○ | 1.7 | −0.9 | 1329 | ○ |
| Example 6 | Zn | 1.0 | 1.5 | ○ | 1.3 | −0.76 | 1100 | ○ |
| Example 7 | Ge | 1.0 | 1.5 | ○ | 1.3 | 0.25 | 1160 | ○ |
| Example 8 | Au/Cr | 1.0/1.0 | 1.5 | ○ | 2.2 | 1.52/−0.9 | 6766 | ○ |
| Example 9 | Au/Zn | 1.0/1.0 | 1.5 | ○ | 1.9 | 1.52/−0.76 | 2400 | ○ |
| Example 10 | Au/Ge | 1.0/1.0 | 1.5 | ○ | 1.6 | 1.52/0.25 | 1390 | ○ |
| Example 11 | Au/In | 1.0/1.0 | 5.0 | ○ | 1.3 | 1.52/−0.34 | 2005 | ○ |
| Example 12 | Fe/Cr | 1.0/1.0 | 1.5 | ○ | 2.2 | −0.44/−0.9 | 1360 | ○ |

Examples 1 to 12 and Comparative Examples 1 to 5 were measured for high-temperature accelerated service life (125° C., 12 V). The 50-percentile service life values based on high-temperature accelerated service life are shown in Table 1. If the 50-percentile service life value is 1000 minutes or more, the component was determined as good. As shown in Table 1, the components in Examples 1 to 11 were determined as good. This is probably because their atomic concentration ratio of additive metal element(s)/liquid phase component was 1.3 or higher at the boundaries of dielectric grains. Manifestation of similar operations and effects was confirmed when an additive metal element(s) representing one or more types selected from As, Co, Ir, Mg, Os, Pd, Re, Rh, Ru, Se, Sn, Te, W, Zn, Ag, Mo, and Ge was/were contained. By contrast, the component in Comparative Example 1 was not determined as good. This is probably because no additive metal element was added to the internal electrode patterns. The components in Examples 2 and 3 were not determined as good, either. This is probably because their atomic concentration ratio of additive metal element(s)/liquid phase component was under 1.3.

Examples of the present invention were explained above in detail; however, the present invention is not limited to these specific examples, and various modifications/changes can be made within the scope of the key points of the present invention as described in What Is Claimed.

What is claimed:

1. A ceramic electronic component characterized by comprising a multilayer chip constituted by alternately stacked multiple dielectric layers whose primary component is ceramic, and multiple internal electrode layers whose primary component is metal and which contains at least one additive metal element different from the primary component metal, wherein:

at least one of the multiple internal electrode layers has, at its interface with an adjoining dielectric layer, a segregation layer containing the at least one additive metal element different from the primary component metal of the internal electrode layers, wherein a concentration of the at least one additive metal element in the segregation layer is higher than that in the multiple internal electrode layers; and Si and the at least one additive metal element are present at least at a grain boundary between two dielectric grains directly adjacent to each other among dielectric grains constituting the adjoining dielectric layer, wherein a ratio of a highest atomic concentration of the at least one additive metal element in total to a highest atomic concentration of Si within the grain boundary is 1.3 or higher, wherein the at least one additive metal element, which is present in the segregation layer and the grain boundary, is the at least one additive metal element contained in the at least one of the multiple internal electrode layers and diffused to the segregation layer and the grain boundary.

2. The ceramic electronic component according to claim 1, wherein, between the two dielectric grains directly adjacent to each other via the grain boundary, a concentration peak or the highest atomic concentration of the at least one additive metal element, and a concentration peak or the highest atomic concentration of Si, are present independently at any positions within the grain boundary.

3. The ceramic electronic component according to claim 1, wherein, in the adjoining dielectric layer, a percentage ratio of Si relative to Ti is 0.1 at % or higher and 5.0 at % or lower.

4. The ceramic electronic component according to claim 1, wherein the at least one additive metal element is distributed at a higher average concentration than an average concentration of Si at the grain boundary.

5. The ceramic electronic component according to claim 1, characterized in that the additive metal element(s) is/are one or more types selected from As, Au, Co, Cr, Cu, Fe, In, Ir, Mg, Os, Pd, Pt, Re, Rh, Ru, Se, Sn, Ge, Te, W, Y, Zn, Ag, Mo, and Ge.

6. The ceramic electronic component according to claim 1, wherein the at least one additive metal element include a first additive metal element and a second additive metal element, where a difference between an oxidation-reduction potential of the first additive metal element and an oxidation-reduction potential of the second additive metal element is 1.8 V or more.

7. The ceramic electronic component according to claim 1, wherein the primary component of the multiple internal electrode layers is Ni or Cu.

8. The ceramic electronic component according to claim 1, wherein the multiple internal electrode layers contain the at least one additive metal element by 0.01 at % or more and 5 at % or less in total relative to the primary component metal.

9. The ceramic electronic component according to claim 1, wherein a per-layer thickness of the multiple dielectric layers is 0.2 μm or more and 10 μm or less.

10. The ceramic electronic component according to claim 1, wherein an average grain size of the dielectric grains in the multiple dielectric layers is 20 nm or more and 600 nm or less.

11. The ceramic electronic component according to claim 1, wherein a per-layer thickness of the multiple internal electrode layers is 0.1 μm or more and 2 μm or less.

12. A ceramic electronic component characterized by comprising a multilayer chip constituted by alternately stacked multiple dielectric layers whose primary component is ceramic, and multiple internal electrode layers whose primary component is metal and which contains at least one additive metal element different from the primary component metal, wherein:

at least one of the multiple internal electrode layers has, at its interface with an adjoining dielectric layer, a segregation layer containing the at least one additive metal element different from the primary component metal of the internal electrode layers, wherein a concentration of the at least one additive metal element in the segregation layer is higher than that in the multiple internal electrode layers, wherein the at least one additive metal element does not include Mg; and Si and the at least one additive metal element are present at least at a grain boundary between two dielectric grains directly adjacent to each other among dielectric grains constituting the adjoining dielectric layer, wherein a ratio of a highest atomic concentration of the at least one additive metal element in total to a highest atomic concentration of Si within the grain boundary is 1.3 or higher.

13. A ceramic electronic component characterized by comprising a multilayer chip constituted by alternately stacked multiple dielectric layers whose primary component is ceramic, and multiple internal electrode layers whose primary component is metal and which contains at least one additive metal element different from the primary component metal, wherein:

at least one of the multiple internal electrode layers has, at its interface with an adjoining dielectric layer, a segregation layer containing the at least one additive metal element different from the primary component metal of the internal electrode layers, wherein a concentration of the at least one additive metal element in the segregation layer is higher than that in the multiple internal electrode layers, wherein the at least one additive metal element is one or more selected from As, Au, Co, Cr, Fe, Re, Se, Te, W, and Mo; and Si and the at least one additive metal element are present at least at a grain boundary between two dielectric grains directly adjacent to each other among dielectric grains constituting the adjoining dielectric layer, wherein a ratio of a highest atomic concentration of the at least one additive metal element in total to a highest atomic concentration of Si within the grain boundary is 1.3 or higher.

* * * * *